Jan. 29, 1963     R. L. SYLVESTER ETAL     3,075,659
LOAD TRANSFER MEANS
Filed May 12, 1958     5 Sheets-Sheet 2
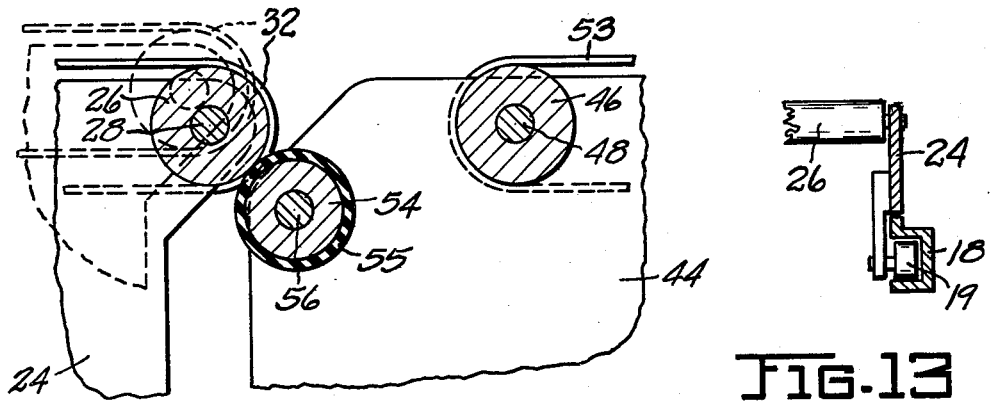
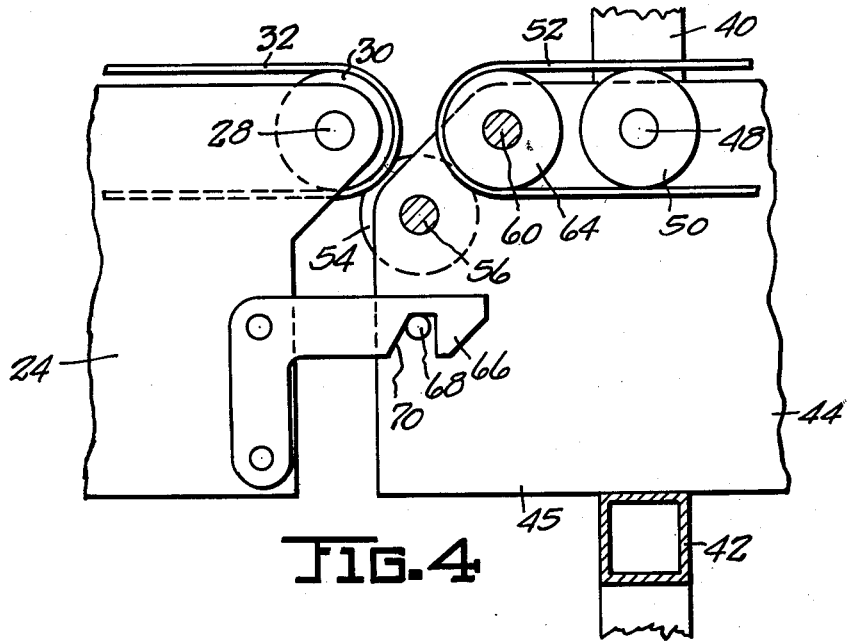
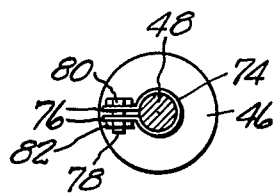
ROWLAND L. SYLVESTER.
GLENN N. ROMINE
INVENTORS
BY
Eugene W. Knobloch
ATTORNEY Jan. 29, 1963  R. L. SYLVESTER ETAL  3,075,659
LOAD TRANSFER MEANS Filed May 12, 1958 5 Sheets-Sheet 4

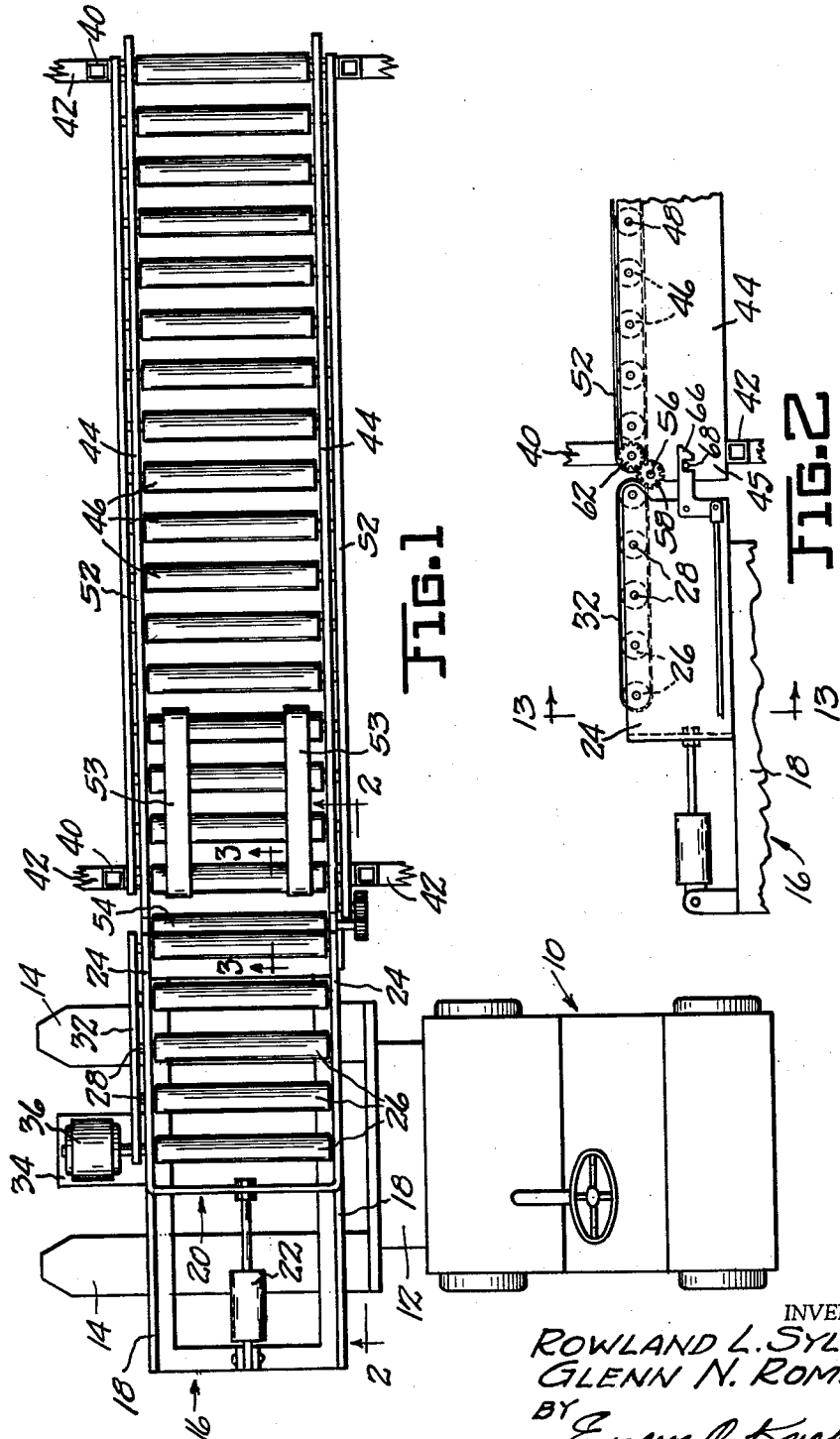

INVENTORS.
ROWLAND L. SYLVESTER.
GLENN N. ROMINE
BY Eugene C. Knoblock
ATTORNEY

Jan. 29, 1963  R. L. SYLVESTER ETAL  3,075,659
LOAD TRANSFER MEANS

Filed May 12, 1958  5 Sheets-Sheet 5

ROWLAND L. SYLVESTER
GLENN N. ROMINE
INVENTORS

BY
Eugene C. Knoblock
ATTORNEY

United States Patent Office 3,075,659
Patented Jan. 29, 1963

3,075,659
LOAD TRANSFER MEANS
Rowland L. Sylvester, Mishawaka, and Glenn N. Romine, Fort Wayne, Ind., assignors to Rack Specialists, Inc., South Bend, Ind., a corporation of Indiana
Filed May 12, 1958, Ser. No. 734,677
13 Claims. (Cl. 214—38)

This invention relates to load transfer means, and particularly to means usable in a warehouse or storage area for transferring a load from a mobile carrier to a rack or storage support and to transfer a load from such rack or storage support to a mobile carrier.

In warehouses and other storage areas it is customary to store products in racks in what is known as selective storage. Unit loads of the product or individual packaged products or individual product items are mounted in selected areas, cubicles or spaces of a storage rack so as to be available in a predetermined location when demand for such item arises. In order that maximum utilization of storage space may be realized, it is important that the racks or storage structures be so constructed as to accommodate in each cubicle or space of the rack a number of unit loads of the product as distinguished from arranging the racks in shallow depth so that only one unit load can be accepted in each cubicle.

The provision of racks of a depth to receive multiple unit loads introduces the problem of moving the unit load within the rack, and of securing access to unit loads positioned intermediate the length of each cubicle and remote from the access ends thereof.

It is the primary object of this invention to provide load-storing racks which will accept multiple unit loads in an elongated load compartment and which will provide for access to all loads contained in each cubicle or compartment rapidly and conveniently.

In the handling of bulk loads in factories, warehouses and other storage areas, it is common to employ mobile load carriers which can carry a load at any selected elevation as a means for delivering a heavy unit load from one location to another. Fork lift trucks are commonly used for this purpose and entail a mobile self-propelled dirigible vehicle having forwardly projecting load-carrying lift arms mounted upon mechanism accommodating vertical movment thereof to different elevations. A load is mounted upon a pallet, a skid, a skid box or other carrier or support having depending legs or other supports providing a space below the load-supporting bottom of the carrier in which the lift truck fork arms may fit with vertical clearance. It will be apparent that the deposit of a load into a rack cubicle requires that the truck be manipulated to cause its fork arms to enter the cubicle. This requires the use of wide aisles in a storage space in order to permit the truck to turn at right angles to the aisle, and has other disadvantages.

It is another object of this invention to eliminate the need for physical insertion of any part of a carrying vehicle into a storage rack or structure for the purpose of transferring a load from the vehicle to the rack or structure or for the purpose of transferring such a load from the rack or structure to the load-carrying vehicle.

A further object of this invention is to provide a load-carrying vehicle having a load-supporting portion thereof adapted to be elevated and lowered by power with means for shifting a load transversely or horizontally thereon and means for actuating a shiftable load carrier upon a storage rack.

A further object is to provide a device of this character wherein a load-carrying vehicle has vertically adjustable load-carrying means including a power operated mechanism for shifting a load horizontally, and wherein a storage rack has means for shifting a load horizontally thereon, and wherein a detachable drive connection is provided between the load-shifting means on said vehicle and on said rack engageable to selectively operate said load-shifting means for transfer of a load from said vehicle to said rack or from said rack to said vehicle.

Other objects will be apparent from the following specification.

In the drawings:

FIG. 1 is a top plan view illustrating one embodiment of our invention;

FIG. 2 is a fragmentary vertical sectional view taken on line 2—2 of FIG. 1 and illustrating the driving connection between load-shifting means on a load-carrying vehicle and load-shifting means on a rack;

FIG. 3 is an enlarged fragmentary sectional view of a driving connection between the load carrier on the vehicle and the storage rack, taken on line 3—3 of FIG. 1;

FIG. 4 is an enlarged fragmentary side view of the driving connection between a load carrier on a vehicle and on a rack with drive pinions removed;

FIG. 6 is a detail view illustrating the construction of frictional rotation-retarding means associated with the load transfer means on a rack;

FIG. 13 is a detail sectional view taken on line 13—13 of FIG. 2.

Figure 5:
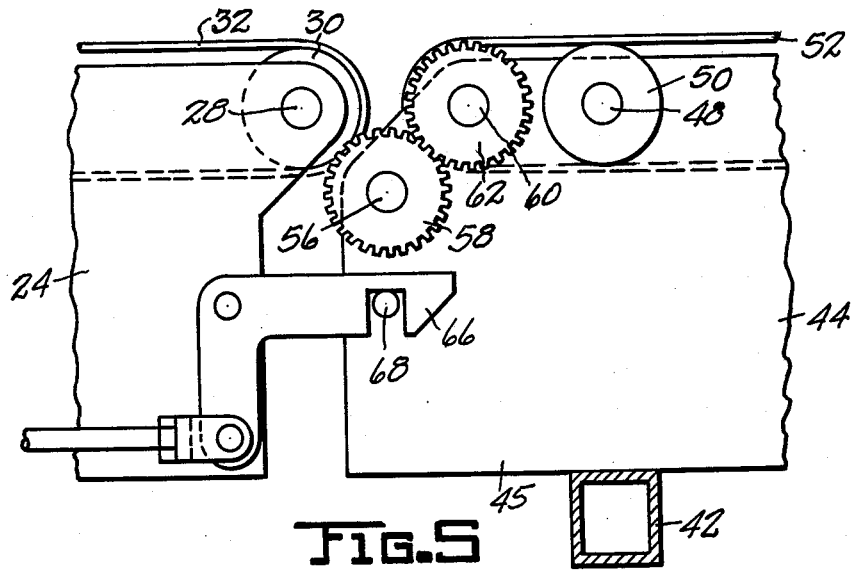
FIG. 5 is a fragmentary enlarged side view of the complete driving connection between vehicle-mounted and rack-mounted load-shifting means.

Referring to the drawings which illustrate the invention, and particularly to FIGS. 1 to 6 which illustrate one embodiment of the invention, the numeral 10 designates a load-carrying vehicle of the dirigible self-propelled type which is provided with a mast or other elevating structure 12 for controlling the elevation of a member 14 on which a load carrier 16 is mounted. The vehicle may be dirigible or may operate on tracks. The example shown is a counterbalanced fork lift truck which may be used with or without the fork arms conventional in such vehicles, and which, if they are used, are secured to the part 12 in the conventional manner.

In the form shown, the load carrier 16 has transversely extending guides or tracks 18 traversed by supporting wheels 19 (FIG. 13) of a shiftable frame unit 20. Suitable power actuated means 22, such as a hydraulic cylinder-piston unit, may be employed to shift the frame member 20 along the guides 18 of the carrier 16 to a limited extent to be described.

The carrier frame 20 will preferably include parallel rigid frame parts 24 extending substantially parallel to the guides 18. A plurality of rollers 26 are journaled by and extend between parts 24 with their axes in a common horizontal plane. Rollers 26 are preferably spaced substantially uniformly and extend parallel to each other, with the uppermost portions thereof extending slightly above the level of the top edges of the adjacent frame members 24. If desired, an endless belt (not shown) may be trained around rollers 26.

Common means are provided for preferably simultaneously and equally driving the rollers 26. Thus the shafts 28 of the rollers 26 may project beyond one of the said members 24 and may mount drive transmission members 30 engageable with a drive member 32. For example, the members 30 may be pulleys and the member 32 may be a belt or the members 30 may be sprockets, and the member 32 may constitute a chain or a link belt. The shiftable frame 20 may carry a platform or support 34 upon which is mounted a prime mover 36, such as an electric motor or a hydraulic motor, for the purpose of driving the member 32 and transmitting to all of the rollers 26 equal and simultaneous rotation. Suitable control means (not shown) are provided for the device and, if manual, may be mounted upon the vehicle 10 within reach of a driver or operator of such vehicle, and, if automatic, may be remotely located at a control station (not shown). The power units 22 and 36 will be connected to such controls by flexible elongated leads, such as flexible hydraulic conduits or flexible electrical insulated conductors (not shown), all as well understood in the art. Suitable power means, such as electrical batteries or generators or hydraulic pumps (not shown hereon) will be provided upon the vehicle 10.

A storage rack for unit loads includes fixedly interconnected rigid uprights 40, transverse members 42, and longitudinal elongated rigid members 44. The rack will preferably be constructed to provide therein a plurality of storage cubicles or compartments at different levels, each open at least at one end and preferably at both ends thereof. The cubicles are of a width and height to receive one unit load and are preferably of a length sufficient to receive and store therein a plurality of unit loads arranged side by side and substantially horizontally aligned. In the form of the construction here shown, the end portions 45 of the longitudinal rack members 44 will project beyond the outermost faces of the adjacent upright rack parts 40 and transverse rack parts 42, for purposes to be described.

A plurality of rollers 46 are journaled in equally spaced relation to extend between the longitudinal rack members 44 on parallel axes preferably located in a common plane. The upper portions of the rollers 46 preferably project above the level of the top edges of the longitudinal rack members 44. The shafts 48 of the rollers 46 project beyond one of the longitudinal members 44 of the rack, and each mounts thereon a drive-transmitting member 50, such as a sprocket or pulley, having a driving connection with a drive-transmitting member 52, such as a chain, link belt or V-belt. The member 52 serves to rotate equally, simultaneously, and in the same direction each of the rollers 46.

If desired, a belt 53 may be trained around a plurality of rollers 46 at one end of the rack, or at both ends, as seen in FIG. 1.

The projecting ends 45 of the frame members 44 serve to support rotatably between them a transverse roller 54 which is parallel to and preferably is spaced from the outermost or adjacent roller 46 and preferably is located at a different elevation than the rollers 46. The roller 54 will preferably include a peripheral layer 55 of rubber or other material having good traction when contacting a moving or rotating object. The roller 54 will preferably project beyond the ends and above the upper edges of the frame parts 45, as best seen in FIG. 3.

Drive means interconnect the roller 54 and the rollers 46. Thus, as here shown, a portion of the shaft 56 of roller 54 may project outwardly beyond one frame part 45 to mount a pinion 58. A stud shaft 60 may be carried by the adjacent part of the frame by suitable journal means to fixedly mount a pinion 62 meshing with the pinion 58. A drive member 64, such as a sprocket or pulley, is also splined or otherwise fixedly mounted on stud shaft 60 and has driving connection with a driving element 52 for transmitting rotation to rollers 46.

Means are provided upon the load carriers of a vehicle and upon the rack, respectively, for bringing these parts into a selected relation to each other for drive transmission from one to the other and for substantially horizontal alignment of the sets of rollers 26 and 46. One form such means may take is illustrated in FIGS. 2, 4 and 5, wherein each of the side members 24 of the shiftable frame of the vehicle mounted load carrier has a hook 66 projecting therefrom at its end and engageable with a fixed abutment or part 68 carried by the rack. Part 68 may be a pin or pins carried by the rack at the mouth of each cubicle, in such predetermined relation that when a hook 66 engages a pin 68, as illustrated in FIG. 4, the load carrier of the vehicle will substantially register with the load carrier of the rack vertically and laterally, and the end roller 26 on the work carrier will be held in parallel linear frictional rotation-transmitting engagement with the roller 52 of the rack at the lower front end of the selected cubicle of the rack.

It will be apparent that the mast structure 12 of the vehicle 10 will permit adjustment of the load carrier 14—16 vertically while the power member 22 on the carrier frame 16 will provide adjustment of the shiftable roller carrier 20 laterally of the vehicle 10 and carrier frame 16. Consequently, the operator of a load-carrying vehicle can travel along an aisle to a local transfer station at which the load is substantially aligned with a selected one of the superimposed cubicles of the section of the rack at which the load on the vehicle is to be deposited, or to a position with the vehicle load carrier aligned with the load carrier of the cubicle from which a load is to be withdrawn. The truck will travel in a direction substantially at right angles to the rack members 44 and will occur with sufficient clearance to avoid accident. The operator stops the truck at such load transfer station and then adjusts the vertical position of the load carrier 16, 24 by manipulation of the mast 12 until the tip of the hook 66 is at a level above the pins or abutments 68 on the rack at the mouth of the cubicle into which a load is to be delivered or from which a load is to be withdrawn. Thereupon the mechanism 22 can be actuated to shift the load-carrying frame 20 toward the rack with the hooks 66 above the abutments 68. Thereupon the elevating means of the truck can be operated to lower the load carrier to engage the hooks 66 with the abutment 68.

The hooks 66 will preferably have inclined edges 70 which serve as cams to urge the load carrier bodily toward the rack as such surfaces 70 ride downwardly upon the abutment 68 and thus tend to wedge or cam the load carrier relative to the rack to the extent necessary to insure a drive-transmitting frictional engagement of the outermost roll 26 with the roll 54. At the same time the angle will be so selected that the parts will not be so firmly wedged together as to prevent the disengagement of the hooks 66 from the abutment 68. Also, as best illustrated in FIG. 3, the roll 54 will be positioned some-what below the level of the roll 26 which it engages to further facilitate separation of the parts as soon as the load carrier is shifted upwardly by the elevating means of the vehicle.

When the load carrier is in hooked engagement with the rack so that there is a drive-transmitting frictional engagement between the endmost vehicle carrier roller 26 and the rack-mounted roller 54, the drive means 36 for the rollers 26 upon the load carrier will be actuated in proper direction, and the rotation thereof will be transmitted to the rollers 46 upon the rack. The drive means 36 will, of course, be reversible so that the direction of rotation of the rollers may be as selected by the operator. This will permit a load mounted upon the load carrier to be rolled into the desired cubicle of the rack and to be advanced in that cubicle to any desired extent, in the event that all of the rollers 46 of the rack are interconnected for simultaneous rotation by the drive means 50, 52. Similarly, by reversal of the direction of rotation of the drive means 36, a load upon the rack at any position in the cubicle can be propelled out of the rack and onto the rollers 26 of the load carrier.

It will be understood that all of the rollers 46 of the rack need not be interconnected by the drive means 50, 52 in cases where the racks are loaded at one end thereof and are unloaded at the opposite end thereof. In such cases the rack members 44 may be positioned at a slight incline, such as in the order of one-quarter of an inch per foot, and the common plane of the axes of the shafts 48 of the rollers 46 is similarly inclined. In such a case only the group of rollers adjacent each end of each cubicle may be interconnected by driving means, such as the means 50, 52 described herein, and the intervening rollers may be idlers along which unit loads are free to roll toward the lowermost discharge end of the rack cubicle. In such as case, as well as in the case of a rack in which all of the rollers 46 have a driving interconnection, suitable means may be provided to retard free rotation of the rollers when not positively powered or driven. A similar restraint upon free rotation may be desirable in connection with the vehicle mounted load carrier. One form of such retarding means is illustrated in FIG. 6, wherein one or more of the shafts 48 adjacent each end of each cubicle of each rack is journaled within a split bushing or is encircled by a split clamp 74 which is fixedly anchored by suitable means (not shown) to the rack frame part 44. The clamp 74 has ears 76 projecting therefrom and apertured to receive the shank 78 of a drawbolt having a head 80 bearing against one flange 76. A nut 82 threaded on the bolt shank 78 bears against the other flange 76. The extent to which the nut 82 is tightened upon the bolt shank determines the clamping or rotation-retarding action exerted upon the shaft 48 by the clamp 74. Such frictional rotation-retarding means insures that the rollers can be so adjusted that excessive or undesirable rotation thereof and resultant unwanted movement of a load supported thereon can be avoided, and at the same time the frictional retarding force can be controlled so as to avoid interference with desired power-operated rotation of the rollers for load-transferring purposes.

Figure 7:
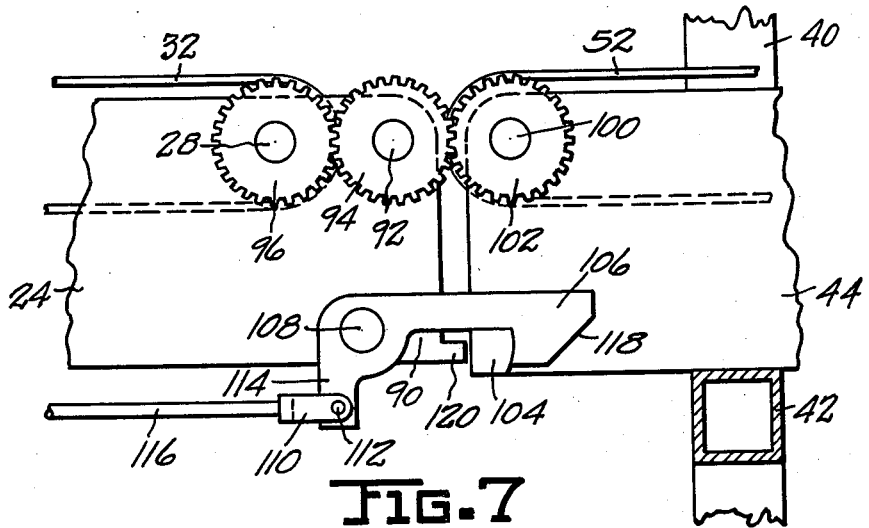
FIG. 7 is a fragmentary enlarged side view of a driving connection constituting another embodiment of the invention.

In the construction of the embodiment of the invention illustrated in FIG. 7, the same reference numerals employed in describing the embodiment shown in FIGS. 1 to 6 are used to the extent of similarity of the parts. In this construction rollers are carried by the frame members 24 of the vehicle-mounted load carrier, and said rollers have a positive driven connection through the medium of drive-transmitting members including the belt or chain 32. At least one of the side members 24 of the frame mounted on the vehicle is projected longitudinally at 90 beyond the foremost or leading roller. Projection 90 mounts a shaft 92 carrying a pinion 94 which is adapted to mesh with a pinion 96 mounted on the shaft 28 of the foremost or leading roller.

Both of the elongated frame members 44 of the rack in this construction project beyond the plane of the front faces of the rack uprights 40, and a roller is mounted on a shaft 100 suitably journaled in the forwardly projecting end portion of the longitudinal rack members 44 with its axis lying in a common plane with the axes of the other rack rollers. The projected portion of the shaft 100 mounts a pinion 102 adapted to mesh with the pinion 94 when the load carrier is brought into juxtaposed relation to the rack at approximately the level of the frame members 44 at the bottom of one cubicle or compartment of the rack. Thus in this construction the pinions 94, 96 and 102 provide a positive gear drive between the roller drive on the vehicle and the roller drive on the rack. This is to be distinguished from the friction drive provided in the embodiment previously described.

It is desirable in this embodiment that the engagement of the teeth of the pinions 94 and 102 may be effected by a horizontal or a combined horizontal and vertical movement of the load carrier on the vehicle. This type of horizontal movement to effect a connection requires a pivoted latch to hold the vehicle load carrier in operative relation to the rack. The forward or projecting portion of the longitudinal members 44 projecting from the face of the rack may be provided with outwardly projecting lugs 104 spaced below the level of the pinion 102. A latch or hook member 106 is engageable with the lug 104 being preferably pivoted at 108 to the side frame part or parts 24 or 90 of the vehicle mounted load-carrying frame. Suitable means may be provided to pivot the latch 106 and for this purpose a clevis 110 may be pivoted at 112 to a depending portion 114 of the latch 106 and may be mounted upon a rod 116 or other means adapted to be moved endwise to control the angular position of the latch 106. Also, the latch may be provided with a camming or beveled surface 118 at its leading end permitting it to ride up and over the lug 104 as the vehicle carried unit is moved endwise toward the rack. Also, if desired, stops may be provided to accurately control the extent to which the vehicle carried frame 24 may move toward the frame parts 44 so that the teeth of the gears 94 and 102 are protected against impact. Such a stop is shown herein at 120, being mounted upon the frame members 24 and engageable with the frame members 44 or with the abutment 104.

It will be apparent that movement of the frame 24 in the plane of the rack member 44 toward the position shown in FIG. 7 will permit positive drive engagement of the gears 94 and 102. The units will be held detachably or releasably in this position by the latch means 106 which engages with the lug means 104 on the racks. Any tendency of the load-transferring operation to separate the vehicle load carrier from the rack is resisted by the latch and thereby a positive driving connection is effected between the load-carrying rollers on the vehicle-carried unit and the rollers in the rack. Manipulation of the rod 116 in proper direction will control both the seating and releasing of the latch with respect to the lugs 104, and the rod 116 will preferably be provided with handle means or with power operated actuating means (not shown), either of which can be located conveniently for manipulation by the driver of the vehicle 10.

Figure 8:
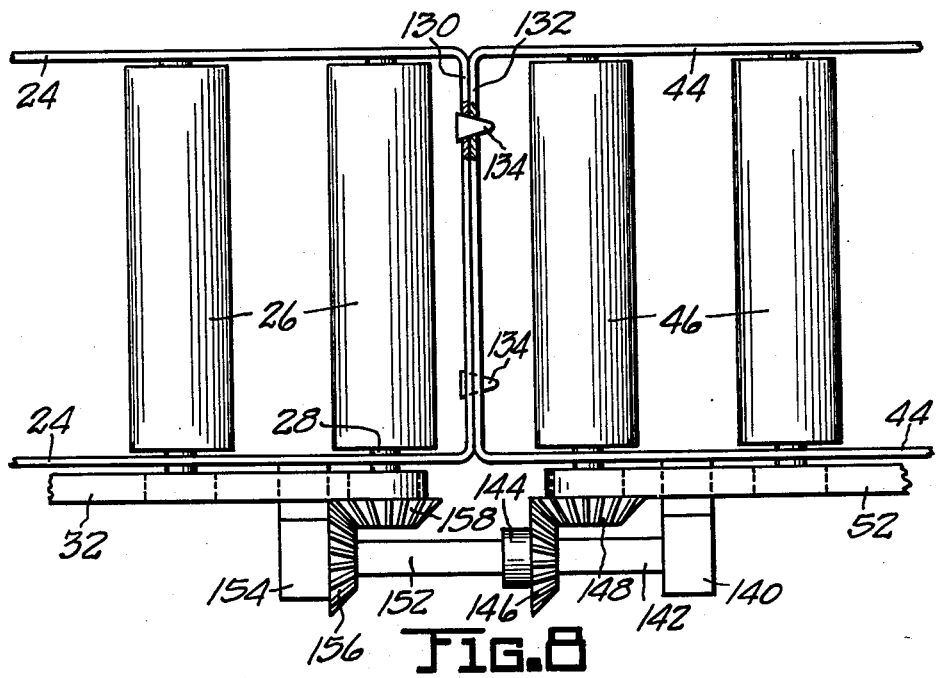
FIG. 8 is a fragmentary top view illustrating still another embodiment of this invention for effecting a driving connection between load-shifting means on a vehicle and load-shifting means on a rack.
Figure 9:
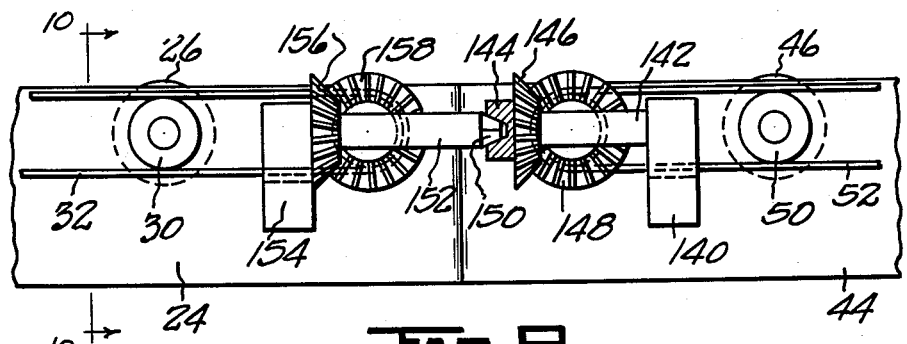
FIG. 9 is a side view of the device shown in FIG. 8, with a part shown in section.
Figure 10:
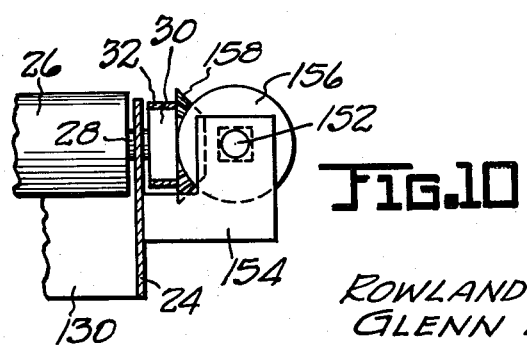
FIG. 10 is a fregmentary sectional view taken on line 10—10 of FIG. 9.

In the construction of the embodiment of the device illustrated in FIGS. 8, 9 and 10, the frame parts 24 of the vehicle mounted carrier are interconnected by a crossmember 130 forwardly of the outermost roller 26. Similarly, a transverse member 132 interconnects the forward ends of the longitudinal rack members 44 outwardly of the outermost rack roller 46. Suitable means may be provided upon the parts 130 and 132 for effecting alignment of the parts 24 and 44 as they are moved toward each other in a horizontal direction. Such means may comprise apertures formed in one of the members 130, 132, such as in the member 132 in the construction shown in FIG. 8, and the fixed mounting of tapered or conical pins 134 upon the other of said two members, such as on member 130, so spaced and located as to cause the parts 130 and 132 to register as the pins 134 seat in the openings of the other frame member.

A block or support 140 is carried by one of the frame members 44 adjacent the end thereof and mounts a shaft 142 spaced outwardly from and extending parallel to the adjacent rack part 44. Shaft 142 mounts a non-circular socket member 144 at its end, with which is fixedly connected a bevel gear 146. The bevel gear 146 in turn meshes with a bevel gear 148 mounted on the shaft of one of the adjacent rack rollers 46. The socket 144, 146 may be journaled upon the shaft 142, or the shaft 142 may be journaled in the block 140 and may have the socket member 144 splined thereon. The opening in the socket 144 will face the end of the rack unit so as to receive slidably therein a non-circular rigid drive-transmitting member 150 of a shaft 152 projecting beyond the end of the frame 24 of the vehicle carrier unit. Shaft 152 is journaled in a block or support 154 carried by one of the frame members 24 of the load carrier on the vehicle. A bevel gear 156 is fixed relatively to the non-circular shaft end 150 and meshes with a bevel gear 158 mounted on the shaft 28 of one of the rollers 26.

It will be apparent that the FIGS. 8, 9, 10 construction provides another type of gear drive for positively driving the rollers 46 of the rack from the rollers 26 of the vehicle mounted load carrier and to accommodate separation of the parts. Also, the construction accommodates the registry of the vehicle carrier with the rack load carrier of a selected rack cubicle necessary to effect interconnection and effective driving relation of parts. A latch (not shown) which may be similar to that shown in FIG. 7 may be used in conjunction with the combination shown in FIG. 8.

Figure 12:
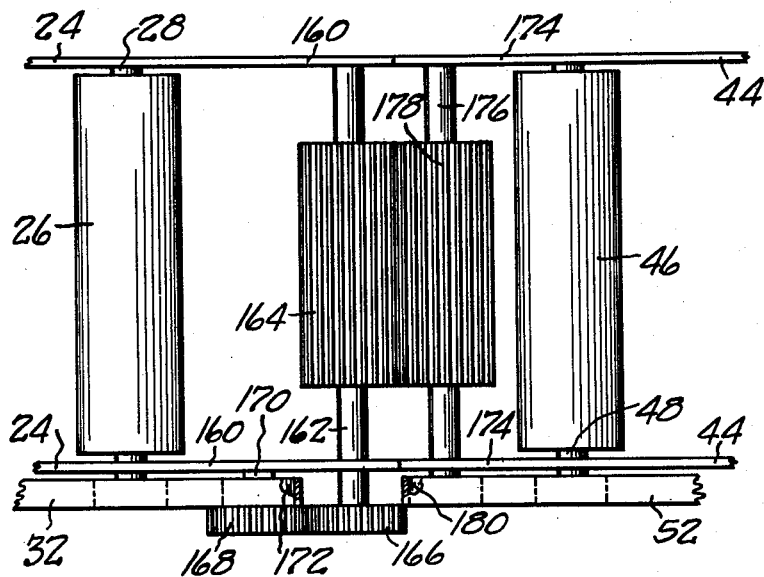
FIG. 12 is a fragmentary top view illustrating another embodiment of the invention for effecting a driving connection between load-shifting means on a vehicle and load-shifting means on a rack.

Another gear type of drive arrangement for effecting a drive between the load carriers of a vehicle and a rack is shown in FIG. 12 and entails a projection 160 on each of the frame parts 24 supported by the vehicle and mounting the rollers 26 thereon. A cross-shaft 162 parallel to the rollers 26 and forwardly thereof is journaled in the frame parts 160 and mounts thereon a gear 164 positioned between the vehicle carrier frame parts 24. A pinion 166 is splined to shaft 162 outwardly of one of the frame parts 160 and in turn meshes with a pinion 168 mounted on a stud shaft 170 carried by the frame part 160 forwardly of the foremost roller shaft 28. A drive transmission member 172, such as a pulley or sprocket on shaft 170 is engageable with the belt, chain or other drive member 32 for driving the rollers 26.

The longitudinal frame members 44 of the rack include projecting end portions 174 whose free ends are spanned by a shaft 176 suitably journaled therein and extending parallel to the rollers 46. The shaft 176 mounts a gear 178 adapted to mesh with the gear 164. A drive transmission member 180 is splined on the shaft 176 for driving connection with a belt, chain or other drive member 52. In this construction a latch (not shown) similar to that described above in connection with the construction in FIG. 7, is preferably employed to engage an abutment on the rack. It will be apparent that in this construction a positive gear drive between the vehicle mounted driven load carrier and the rack rollers is provided, having the same advantages as the constructions previously mentioned.

Figure 11:
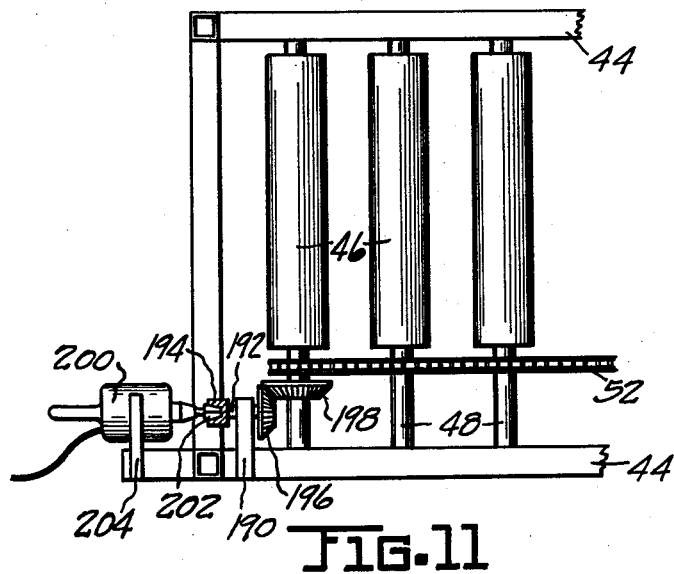
FIG. 11 is a fragmentary top plan view of a rack as shown in FIG. 9, with a different type of drive means for actuating the same.

In some instances it may be desirable to eliminate means for interconnecting and driving rollers on a vehicle mounted carrier and rollers on a stationary rack, and to provide separate means for operating each of these sets of rollers. In such a case the arrangement for operating the rollers upon the vehicle mounted frame may be substantially the same as those described above, but a different type of means for driving the rollers upon the rack may be employed. One form which the roller drive means for the rack may take is illustrated in FIG. 11, wherein one of the rack parts 44 mounts a support 190 within which is journaled a shaft 192 carrying a tool socket 194 at its forward end and a bevel gear 196 at its opposite end. Gear 196 may mesh with a gear 198 splined on the shaft of an adjacent roller 46. A handheld power driven tool 200 may mount a rotary tool head 202 insertable in the tool socket 192 to effect the driving of the shaft 192 and the bevel gears 196 and 198. If desired the rack may mount a bracket 204 to releasably support the hand-held power tool against rotation, so that the operator need not sustain the torque or resistance to rotation which is encountered during operation of the tool to effect driving of the rack rollers 46.

It will be understood that in all constructions the frame members 24 mounted on the vehicle need not be shiftable transversely of the vehicle. Thus the frame 20 may be fixedly mounted upon a vertically shiftable load carrier on the vehicle, such as upon fork lift arms (not shown). In such instances the members 24 will extend parallel to the fork lift arms, and the rollers 26 will extend transversely of the fork lift arms. Consequently, it is necessary that the vehicle be turned in the aisle adjacent to the desired cubicle of the rack in order to position the frame members 24 parallel to the longitudinal rack parts 44 as required to effect transfer of a load. The proper engagement and register of the load with the cubicle into which it is to deposit a load or from which it is to withdraw a load may be effected by manipulation of the elevating means on the vehicle and by forward movement of the vehicle as a whole. In this way the parts can be brought into proper relation to effect the hook connection required in several of the embodiments above illustrated and previously explained.

It will be apparent that in all embodiments and in all forms it is not necessary that any part of the vehicle enter within the rack in order to deposit a load within the rack or to withdraw a load from the rack. Further, it is apparent that both the rack and the vehicle mounted load carrier are provided with live positively driven rollers to effect load transfer between the same when properly positioned with respect to each other. Such construction makes possible the maximum utilization of storage space in a storage area by cutting down the number of aisles used in the area without sacrifice of accessibility of the unit loads within the racks at all times.

While the preferred embodiments of the invention have been illustrated and described herein, it will be understood that changes in the construction may be made within the scope of the appended claims without departing from the spirit of the invention.

We claim:

1. Means for transferring a load between a vehicle and a rack, comprising means for shifting a load substantially horizontally on said vehicle, power driven reversible means for actuating said load-shifting means, means for shifting a load substantially horizontally on said rack, a detachable drive-transmitting connection between said respective load-shifting means for operating the said load-shifting means in the same direction, said drive-transmitting connection including a rotatable member on each of said vehicle and rack, each rotatable member having a drive connection with the associated load-shifting means and extending parallel to the direction in which a load is shifted on said load-shifting means, and releasably interfitting non-circular socket and male drive transmitting parts carried by the free ends of said rotatable members said conveying means being movable bodily substantially horizontally on said vehicle in a guided path sidewise of said vehicle by said power drive reversible means and including a set of parallel rollers connected for simultaneous rotation in the same direction, and reversible power actuated means for driving one of said drive transmitting parts.

2. Means for transferring a load between a vehicle and a rack, comprising means for shifting a load substantially horizontally on said rack, a detachable drive-transmitting connection between said respective load-shifting means for operating the said load-shifting means in the same direction, said drive-transmitting connection including a rotatable member on each of said vehicle and rack, each rotatable member having a drive connection with the associated load-shifting means and extending parallel to the direction in which a load is shifted on said load-shifting means, releasably interfitting non-circular male and female drive transmitting parts carried by the free ends of said rotatable members, and cooperating means on said vehicle and said rack for piloting movement of said vehicle-carried non-circular member into interfitting engagement with said rack-carried non-circular member.

3. In combination, a mobile load carrier having means for elevating and lowering a load, conveying means movable bodily substantially horizontally on said load-elevating means in a guided path sidewise of said mobile carrier, power driven means for shifting said conveying means in said path in selected direction, said conveying means including a set of rollers journaled on axes which are substantially coplanar, horizontal and perpendicular to the path of movement of said conveying means, means for simultaneously and similarly rotating said rollers, a stationary load carrier, a set of rollers journaled on said stationary carrier with their axes substantially coplanar and horizontal and parallel, means for simultaneously and similarly rotating the rollers journaled on said stationary carrier, reversible power-actuated means for driving the rollers of one set, and drive transmitting means connected to one set of rollers and releasably connectable with the other set of rollers, said drive transmission means connecting said sets of rollers for rotation in the same direction when said conveying means is projected sidewise from said mobile carrier to bridge the clearance space between said mobile carrier and stationary carrier and is positioned with its rollers substantially parallel to and at substantially the same elevation as the rollers of said stationary load carrier.

4. In combination, a mobile load carrier having means for elevating and lowering a load, conveying means carried by said load-elevating means and bodily shiftable laterally of said mobile load carrier in selected direction, said conveying means including a set of parallel rollers connected for simultaneous rotation in the same direction, a stationary load carrier, a set of parallel rollers journaled on said stationary carrier and connected for simultaneous rotation in the same direction, reversible power-actuated means for driving one of said sets of rollers, and drive transmitting means mounted on one of said carriers and having a driving connection with the set of rollers thereof, said drive-transmitting means being releasably and drivingly engageable with the set of rollers of the other carrier when the rollers of said sets are substantially parallel and the conveying means on said elevating means is positioned at predetermined juxtaposition and alignment and elevation relative to the set of rollers on the stationary carrier and is projected laterally from the mobile carrier to bridge the gap between said carriers.

5. In combination, a dirigible self-propelled vehicle having means for elevating and lowering a load, a frame shiftable bodily substantially horizontally on said elevating means and laterally of said vehicle, reversible means for positioning said frame on said elevating means in selected lateral position, a set of parallel rollers journaled on said frame, reversible power-actuated means for driving said set of rollers, a rack, a set of parallel load-conveying rollers journaled on said rack and interconnected for simultaneous and similar rotation, and drive transmitting means on said vehicle having constant driving connection with a set of rollers on said frame and projecting from said frame for releasable driving connection with the set of rollers on said rack when said respective sets of rollers are substantially parallel and are located in predetermined juxtaposition and elevation relative to each other while said frame is extended laterally from said vehicle to span the space between said vehicle and said rack.

6. The combination defined in claim 4 wherein a belt is trained around and supported on the upper portions of rollers of at least one set.

7. In combination, a fork lift vehicle, a rack, conveying means on said vehicle, power driven reversible means for actuating said conveying means, conveying means on said rack, a releasable drive-transmitting connection between said respective conveying means and responsive to selected juxtaposition of said conveying means for operating the said conveying means in the same direction, said vehicle including a support shiftable laterally of said vehicle to project laterally therefrom, and mounting said first named conveying means, power driven reversible means for shifting said support bodily laterally of said vehicle to bridge the gap between said vehicle and said rack, a hook carried by said bodily shiftable support, and a member on said rack releasably engageable with said hook to maintain said selected juxtaposition of said conveying means, each of said conveying means including a set of rollers having their axes substantially parallel and coplanar, means for simultaneously and similarly rotating the rollers of the conveying means on said vehicle, and a belt trained around and supported on the upper portions of the rollers of said rack.

8. In combination, a fork lift vehicle, a rack, conveying means on said vehicle, power driven reversible means for bodily shifting said conveying means of said vehicle laterally of the direction of travel of said vehicle between centered and off-centered position on said vehicle, conveying means on said rack, each conveying means including a set of parallel rollers and means for rotating the rollers of each set simultaneously and similarly, reversible means for driving one set of rollers, a detachable drive-transmitting connection between said respective conveying means and responsive to a selected juxtaposition of said conveying means for operating the said conveying means in the same direction, said drive-transmitting connection including a roller having a driving connection with one of said sets of rollers and frictionally engageable with a roller of the other set in selected juxtaposition of said conveying means.

9. In combination, a fork lift vehicle, a rack, a frame shiftable laterally on said vehicle between centered and laterally projecting position, means for shifting said frame, conveyor means on said vehicle including a set of parallel coplanar rollers connected for simultaneous similar rotation, power driven reversible means for actuating said conveyor means, conveyor means on said rack including a set of parallel coplanar rollers connected for simultaneous similar rotation, a detachable drive-transmitting connection between said respective conveying means for operating the said conveying means in the same direction, said drive-transmitting connection including an idler member having a driving connection with one of said sets of rollers and including a part having a friction surface and engageable with a friction surface of a moving part connected to the other set of rollers when said frame is in laterally projected position, and means detachably interconnecting said frame to said rack to maintain said friction surfaces in engagement.

10. The combination defined in claim 3, wherein said drive transmitting means and the set of rollers releasably rotated thereby each include a rotatable member having a friction surface, said rotatable members being adapted for rotation-transmitting peripheral engagement at said friction surfaces.

11. The combination defined in claim 4, and means for detachably locking said conveying means to said stationary carrier in said predetermined juxtaposition and elevation for effecting driving connection of said sets of rollers by said drive transmitting means.

12. The combination defined in claim 5, and hook means for detachably locking said frame to said rack against relative horizontal displacement when said drive transmitting means is in operative driving connection with the rollers of said rack.

13. The combination defined in claim 5 wherein said drive transmitting means includes gears adapted for meshing driving engagement and each connected to a set of rollers.

References Cited in the file of this patent

UNITED STATES PATENTS

| | | |
|---|---|---|
| 778,613 | Ward | Dec. 27, 1904 |
| 1,386,053 | Dyer | Aug. 2, 1921 |
| 1,955,959 | Harnischfeger et al. | Apr. 24, 1934 |
| 1,969,002 | Gleichman | Aug. 7, 1934 |
| 2,338,359 | Sharp | Jan. 4, 1944 |
| 2,467,354 | Baldwin | Apr. 12, 1949 |
| 2,583,471 | Collis | Jan. 22, 1952 |
| 2,599,052 | Forman | June 3, 1952 |
| 2,699,878 | Avery | Jan. 18, 1955 |
| 2,744,644 | Hackney et al. | May 8, 1956 |
| 2,746,616 | Sinclair | May 22, 1956 |
| 2,791,338 | De Saint-Andre | May 7, 1957 |
| 2,811,240 | Fenton | Oct. 29, 1957 |